US010018979B2

(12) United States Patent
Horowitz et al.

(10) Patent No.: US 10,018,979 B2
(45) Date of Patent: Jul. 10, 2018

(54) DEVICE AND METHOD FOR DETECTION AND/OR DIAGNOSIS OF FAULTS IN A PROCESSES, EQUIPMENT AND SENSORS

(71) Applicant: YPF TECNOLOGÍA S.A., Capital Federal (AR)

(72) Inventors: Gabriel Ignacio Horowitz, Capital Federal (AR); Cristian Martín Dorbesi, La Plata (AR)

(73) Assignee: YPF Tecnologia S.A., Ciudad Autonomo de Buenos Aires (AR)

( * ) Notice: Subject to any disclaimer, the term of this patent is extended or adjusted under 35 U.S.C. 154(b) by 944 days.

(21) Appl. No.: 14/502,309

(22) Filed: Sep. 30, 2014

(65) Prior Publication Data

US 2015/0095003 A1    Apr. 2, 2015

(30) Foreign Application Priority Data

Sep. 30, 2013   (AR) .............................. 20130103536

(51) Int. Cl.
*G06F 7/48*      (2006.01)
*G05B 17/02*     (2006.01)
*G05B 23/02*     (2006.01)

(52) U.S. Cl.
CPC ......... *G05B 17/02* (2013.01); *G05B 23/0254* (2013.01)

(58) Field of Classification Search
CPC .......................... G06F 17/5009; G06F 17/5022

(Continued)

(56) References Cited

U.S. PATENT DOCUMENTS

| 6,917,839 B2 * | 7/2005 | Bickford ............ G05B 23/0254 700/28 |
| 7,991,961 B1 * | 8/2011 | Tsai .................... G06F 12/0253 711/132 |

(Continued)

*Primary Examiner* — Andy Ho
(74) *Attorney, Agent, or Firm* — Muncy, Geissler, Olds & Lowe, P.C.

(57) ABSTRACT

Device and method for the detection and/or diagnosis of faults in a process, equipment and sensors used to measure and control variables of a process, either for single faults or multiple faults. The detection and/or diagnosis are performed on the basis of residual calculation between measured values and values calculated by a plurality of parallel linear models, built up from the existing correlations between the measured variables by the process sensors and by different equations that rule the process, such as mass and heat balances, quality relationships, etc. A fault in a model (i.e. the obtainment of a residual anomaly high by comparing the model estimation and the measurement), increases the probability that some of the parameters or faults associated to that model are failing. When all models in which a participating parameter fail or show a high probability of failure, the anomaly rate of said parameters is maximum. Using said rates and a description of cause-consequence relationship between the parameters a fault probability is obtained, where the root cause of the problem is indicated, indicating the consequences produced in the process. The device comprises data storage means; pre-processing means for filtering data; means for generation and storage of multiple behavior models; residual calculation means for calculating the difference between the measured and the predicted values of the variables; analysis means for determining the need to communicate an anomalous situation; communication means for presenting a process status report.

6 Claims, 4 Drawing Sheets

(58) Field of Classification Search
USPC .......................................... 703/6, 13, 21, 22
See application file for complete search history.

(56) References Cited

U.S. PATENT DOCUMENTS 8,423,484 B2 * 4/2013 Pecht .................... G06F 11/008
706/12
2013/0090889 A1 * 4/2013 Vaidyanathan ........ G01K 1/024
702/136

* cited by examiner

DEVICE AND METHOD FOR DETECTION AND/OR DIAGNOSIS OF FAULTS IN A PROCESSES, EQUIPMENT AND SENSORS

FIELD OF THE INVENTION

The present invention relates to a device and a method for detecting and/or diagnosing faults in a process. The device of the present invention is applicable to the diagnosis of fault sets in a process, in equipment as well as in sensors used for measuring and controlling variables in a process.

BACKGROUND OF THE INVENTION

The normal process operation is fundamental for safety reasons and in order to obtain quality products with maximum profits. Degradation and/or fault in processes are a threat to said aspects and therefore the prevention thereof is an object of the present invention.

Examples of patent documents related to devices for diagnosing faults in equipment and sensors in continuous and discontinuous processes are U.S. Pat. Nos. 6,298,454, 6,356,857, 6,615,090, 7,421,351, 7,451,003, AR 063876 B1 and AR 071423 A1.

In general, these devices comprise several modules or means, said terms being used interchangeably in the present specification, such as: a data storage module, e.g. of the magnetic type; a data filter module, e.g. of the temporal average type; a modeling module that generates a behavior model of the process in normal conditions; a residual calculation module that calculates the differences between the measured value and the predicted value of variables; a decision module for determining the necessity of communication and the kind of results to be delivered (detection, identification or diagnosis) and a displaying module for displaying a process status report.

The modules disclosed in the prior art, generally interact so as to acquire a set of process historical data, corresponding to a period long enough to register most part of the process operating normal conditions. In time, data are filtered in the filtering module prior to generating the model in the modeling module. The monitoring process generally comprises the following steps:
a) measuring the values of the process variables corresponding to the time period to be analyzed;
b) filtering the values in the filtering module;
c) comparing the filtered values to those of models in the modeling module;
d) using the residuals between the predicted and measured values for calculating fault likelihoods of different abnormal situations, the likelihoods being sent to the decision module where they are analyzed for determining any present abnormality and sending the corresponding message.

The main differences between the various devices disclosed in the prior art for diagnosing faults in a process, equipment or sensors lay in the modeling and decision modules. The functioning and interaction between different modules do not significantly vary between all known apparatuses since many of these modules are commercially available in the market.

Devices with said characteristics are disclosed, e.g. in patents U.S. Pat. Nos. 6,415,276, 6,557,118, 6,615,090, 7,096,153 and 7,451,003.

In the last cited patent, diagnostics are obtained from the existing differences between the measurements obtained by sensors and the expected values according to a mathematical model for said measurements. These mathematical models may be built up from historical data about the process functioning in normal operation conditions. It is a single linear model producing a residual vector, i.e. the differences between the model predicted value and the experimental value.

The most used methods for building up these models are, among others, principal component analysis, principal least squares and linear regression. A detailed description of said methods can be found in *Multi and Megavariate Data Analysis* by Eriksson, Johansson Kettaneh-Wold, Trygg, Wikstrom and Wold (2006) UMETRICS ISBN-10:91-973730-2-8.

Devices with said characteristics are also disclosed, e.g. by Petti T. F., Klein J., Dhurjati P. S., *Diagnostic Model Processor: Using Deep Knowledge for Process Fault Diagnosis*, AIChE Journal, Vol. 36, No. 4, pp. 565-575, (1990) and in patent application US 2005/02109337 A1.

The present invention allows detecting and diagnosing various types of faults, whether they are single or multiple. With this objective, multiple models are used based on the equations describing the system, such as mass and energy balances, design equations, relations between variables that ensure product quality, among others.

Said models use the correlation between the process variables. Unlike other diagnostic systems based on multiple models (e.g. Petti T. F., Klein J., Dhurjati P. S., *Diagnostic Model Processor: Using Deep Knowledge for Process Fault Diagnosis*), according to the present invention it is only necessary to indicate which variables participate in the same, but not their explicit equation. This simplifies implementation and allows including relationships even in cases where there is no explicit expression.

From models the residuals of which are statistically significant, according to the present invention, a fault rate of abnormal situations associated with each model is calculated. These rates are then used to build, via a cause-consequence network, the fault diagnosis.

The proposed methodology has several advantages over the use of other models based on physics principles as they do not require the actual calculation of the parameters involved in said models.

Furthermore, the time spent by the person responsible for building the models to indicate the values of constants and parameters can be significant. In the case of the proposed invention the device can work autonomously without specifying anything else than the variables involved in the model.

Regarding Patent AR 063876 B1, one of the closest documents mentioned above, it should be noted that it describes a diagnostic system referring only to the diagnosis of instruments while the system corresponding to the present invention includes instruments and equipment.

Patent AR 063876 B1 relates only to instrument and therefore, causal relationships, a fundamental part of the method of the present invention, are not included. Moreover, the method of patent AR 063876 B1 can be used as a way to calculate the probability of instruments faults as a previous step to the analysis of causal relationships between faults, which is the object of the present invention.

Moreover, regarding application AR 071423 A1, another one of the closest documents mentioned above, the method described therein does not perform a diagnosis but identifies a status of the plant. Thus, the method of application AR 071423 A1 complements the use of the method of the present invention as a way of recognizing a complex fault and deactivate the result communication module to avoid redundant messages to the process operators. Thus, the application AR 071423 A1 relates to a method of acknowledging alarms while the present invention is in charge of diagnosis.

SUMMARY OF THE INVENTION

The objective of the present invention is to provide a device for detection and diagnosis of faults in processes, equipment and sensors, both single faults and multiple faults.

Accordingly, it is an object of the present invention a device for detecting and/or diagnosing faults, including multiple faults, in processes, equipment and sensors used to measure and control variables of a process, based on the calculation of residuals between measured values and values calculated by a plurality of models, the device comprising:

a) data storage means for storing data, comprising a magnetic storage device or other kind of memory;

b) pre-processing means for filtering data, of the running median filter type or a temporal average filter type or others;

c) modeling means for generating and storing multiple models of process behavior under normal conditions, built up from heat, mass and motion balances, stoichiometric and quality relationships and others, and existing correlations between variables measured by process sensors;

d) residual calculating means for calculating the difference between measured values and predicted values for variables;

e) calculating means for calculating fault likelihood by computing the probability of anomalies in parameters or faults;

f) analysis means for determining the need to report an anomalous situation in a given process, equipment or sensor, capable to deliver results ranging from a mere detection of a problem to a diagnosis of the problem beyond the variables involved; and g) communication means to present a status report of the process.

In a more preferred embodiment of the invention, the modeling means generates all linear models that correlate groups of two or more variables from measured and normalized historical data.

In another preferred embodiment of the invention, the calculating means generates a residual for each of the models.

In yet another preferred embodiment of the invention, the means of analysis compares each residual with its threshold value and calculates a fault feasibility rate for each variable.

In a preferred embodiment of the invention, the communication means can send the obtained results via an interface, a screen, an e-mail, or other communication devices, either wired or wireless.

It is another object of the present invention a method for diagnosis of complex faults, including multiple faults in sensors, which by the aforementioned means and using the aforementioned fault feasibility rates and a set of causal relationships between faults stored in an adjacency matrix, allows selecting the set of faults that best explains the current process behavior.

The device of the present invention performs this task by weighing each global diagnosis according to the likelihood of occurrence of the faults included therein and the causal relationships between these faults.

The result is presented through the communication means, as a report of the status of the process, thus obtaining the status of sensors, detecting whether operation thereof is normal or with faults.

DETAILED DESCRIPTION OF THE INVENTION

The invention relates to a device for the detection and diagnosis of faults in processes, whether faults related to measured variables or not. The detection is done by comparison of the values obtained by a group of sensors with those expected according to a group of models obtained from historical data about the process operation under normal conditions.

The device of the invention allows the detection and diagnosis of single faults and multiple failures, unlike many of the known devices in the prior art like Oyeleye O. O., Kramer M. A., "Qualitative Simulation of Chemical Process Systems: Steady-State Analysis", AIChE Journal, Vol. 34, No 9, pp. 1441-1454, (1988) and Kramer, M. A., "Malfunction Diagnosis Using Quantitative Models and Non-Boolean Reasoning in Expert Systems". AIChE J., 33,130 (1987a) and in patent application US 2005/0210337 A1.

To achieve this objective, the device of the invention utilizes a plurality of models, which are composed of the measured variables and are related to anomalous situations that explain the anomaly of each particular model.

Figure 1:
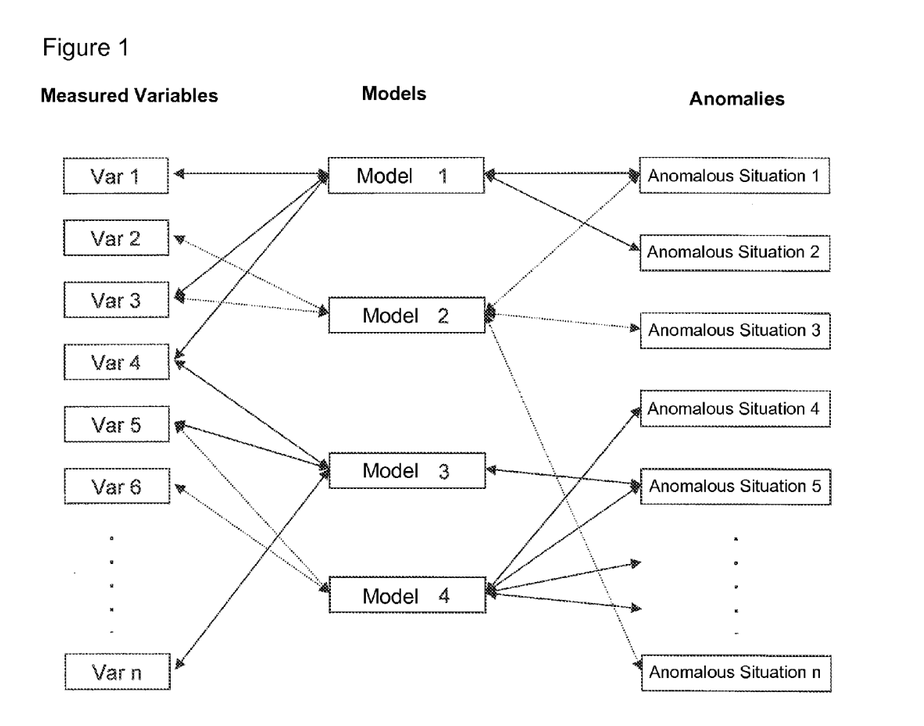
FIG. 1 illustrates a scheme of the model composition.

FIG. 1 shows, by way of example the composition of the models of the invention. Each model is calculated from the different measured process variables, which are shown on the left side of the figure; and is associated with anomalous situations that are shown on the right side.

An analysis begins with a measurement, which can be normalized, and then perform the calculation of the residual of each model. An abnormally high difference or residual in a model generates a presumption of the occurrence of any anomalous situations corresponding to that model. When all models associated with a given anomaly fail, the presumption that an anomaly is occurring is maximum. Thus, from the evaluation of model residuals and their associated anomalous situations, a fault likelihood is obtained for each of the anomalous situations. In the particular case of instrument faults, the fault rate can be calculated with the method described in patent AR 063876 B1.

Possible anomalous situations by themselves give information about the problem, but for a complete diagnosis it is necessary to establish what is actually happening in the process. Fault likelihoods of anomalous situations are analyzed together by previously defined cause-consequence relationships based on what is known about the process, determining the anomaly that caused the fault detected in the process and the consequences thereof.

Figure 2:
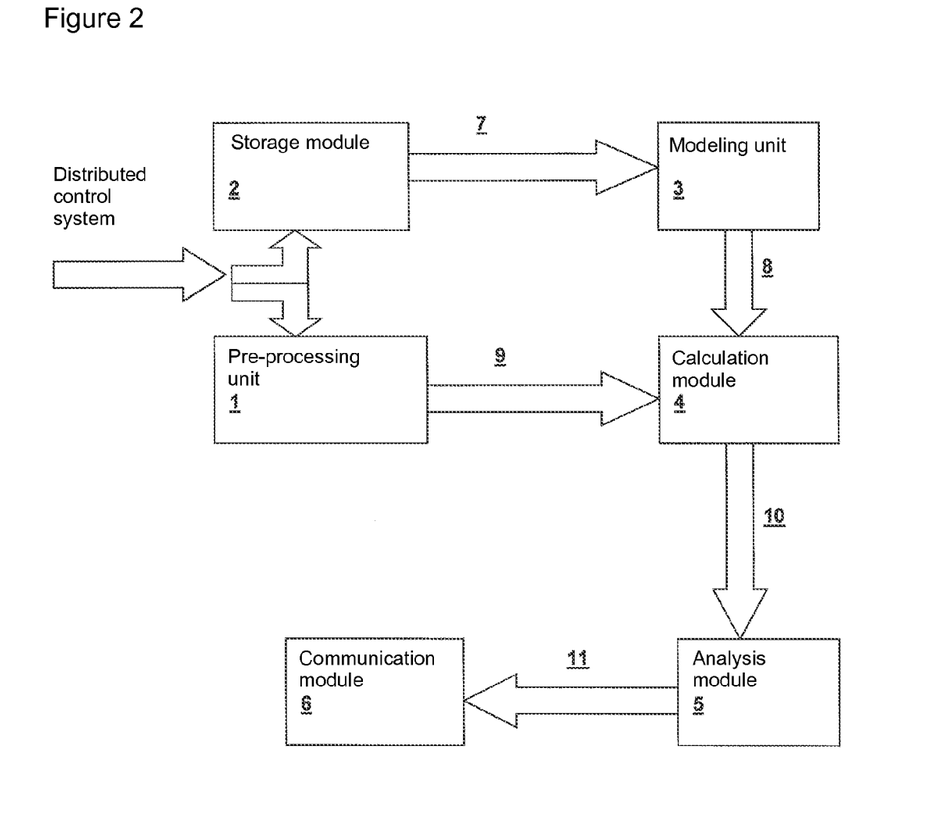
FIG. 2 illustrates a scheme of the device of the present invention, comprising six process units or modules.

Referring now to FIG. 2, as an example of an embodiment of the present invention, it shows a diagram of the device for detection and diagnosis of faults in a process, object of the present invention. The device is fed with the sensor measurements of the process being controlled, such as those obtained from a distributed control system (DCS) in an industrial plant.

The data obtained from the DCS have two destinations: first, they are stored in the storage module (2) for later use in updating models and second they are treated in the pre-processing unit (1). The storage module contains all measured data up to the date. From these data a subset of historical data (7) representing the normal operation of the process is selected and is used to generate a series of models of the process normal behavior.

The models are built and stored in the modeling unit (3). This is a set of matrices representing the correlation between groups of process variables during normal operation. They are constructed using principal component analysis, partial least squares, linear regression or other methods.

The variables that make up a model are selected based on the measured variables and that form part of balances of mass, energy, and motion, and stoichiometric equations of different parts or equipment of the process and relationships between variables that ensure product quality, relations between set point and controlled variable, etc.

In the process of building a model is convenient to include the normalization of data, i.e. the transformation thereof into a data set with zero mean and unitary variance. In order to do this, it is necessary to calculate the mean and standard deviation of the historical data. These data are also stored in the pre-processing unit (1) which normalizes and filters the data corresponding to the current process status. The result of this preprocessing is a set of normalized and filtered data (9).

From the pre-processed data (9) and process models (8), the calculation module (4) calculates the residuals and from the analysis thereof, also a likelihood (10) for each potential anomaly.

The rates are analyzed in the analysis module (5). This initial analysis is the calculation, via a network of cause-consequences between anomalous situations, of the root cause and pattern of spread of the detected anomaly.

Each of the possible combinations of anomalous situations is a diagnosis and for said diagnosis a feasibility rate is calculated. The calculated feasibility indicates how feasible said diagnosis is.

Diagnoses (11) (combinations of anomalous situations) have root causes, i.e. anomalous situations of the diagnosis that are not the result of any other anomalous situation of said diagnosis.

Diagnoses, specifying anomalous situations that are causes and those that are consequences, are classified according to their feasibility and/or causes and are transmitted to the process operator via an interface (display), by electronic mail or other means using the communication module (6).

Pre-Processing Unit

The pre-processing unit (1) processes the data vector of all measured variables corresponding to a time interval in the process and initially filters it to remove noise. To this end running moving average filters, averages for a given time interval or other filters can be used. In the case of using averages, this time interval can be from 1 second to a week but intervals from 30 minutes to one hour are preferred. These filtered data are stored in the storage module for later use in updating the models.

If the data is to be used to diagnose the current state of the process, it must be normalized. To do this, there must be available the mean $\mu_n$ and the standard deviation $\sigma_n$ of every variable n calculated from the historical data of the process in normal operation conditions. Thus, the measured value $xm_n$ of variable n is converted to a normalized value x, by means of the following equation (1):

$$x_i = \left(\frac{xm_i - \mu_i}{\sigma_i}\right) \quad (1)$$

Composition of Equations or Models

The equations can be, for example, mass balances, heat balances and momentum equations, status equations, equilibrium equations, stoichiometric equations, set points, relationships that ensure the product quality, or any other equation of interest.

Each equation represents the normal behavior of a subsystem of the monitored process. The relationship between the variables represented by said equation is valid only under normal operation conditions. A failure of this relationship indicates an anomalous behavior.

Not all the variables or parameters of each equation are measured. If there is a linear relationship between the measured variables in the historical data, it can be assumed that the non-measured parameters keep constant. Similarly, if said relationship ceases to be valid during the operation of the plant, this is an indication that some of the parameters or assumptions that must be met for the existence of the relationship are no longer satisfied.

The fact of using models based on historical data has two advantages. On one hand it is not necessary to know the value of non-measured parameters as these are automatically included in the linear model. On the other hand, the selection of models/equations that are useful for diagnosis is automatically performed since only those containing variables with significant correlation with the historical data set are used.

The variables and anomalous situations associated with the equations may be of any type. Particularly faulty instruments measurements, out of range measured variables and other types of faults.

Figure 4:
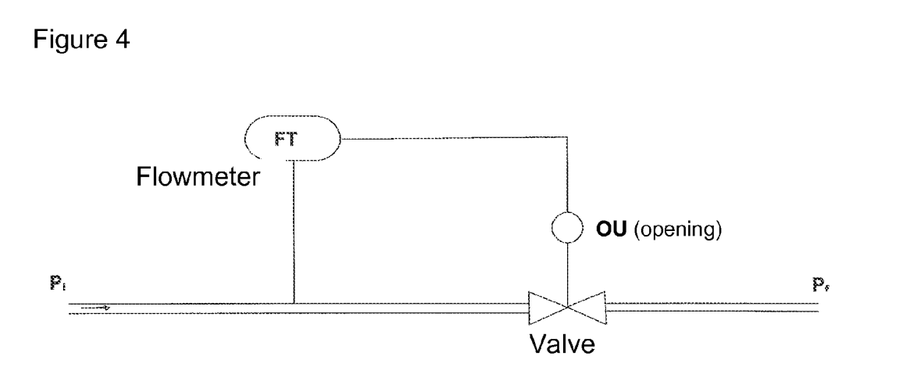
FIG. 4 illustrates the scheme of a system comprising a valve, which is used as an example for the building up of a model. It consists of the measured variables and abnormal situations associated with the model.

Referring to FIG. 4, it shows a small system consisting of a flow rate control valve as an example of building up of a model.

Measured Variables:
  FT: Flow rate
  OU: Valve opening
  $P_i$: Inlet pressure
  $P_f$: Outlet pressure
  K: Proportionality constant Associated Anomalous Situations:
  $z_1$: Change in fluid density
  $z_2$: Blockage in pipe or valve
  $z_3$: Leak
  $z_4$: Instrument FT
  $z_5$: Instrument OU
  $z_6$: Instrument $P_i$
  $z_7$: Instrument $P_f$
  $z_8$: FT Range In this system and assuming turbulent flow the momentum balance equation can be considered as:

$$P_f - P_i \approx \text{Density} * FT^2 * (1 - OU) \quad (2)$$

The model is formed by the correlation between the measured variables of the system, inlet pressure ($P_i$), outlet pressure ($P_f$), flow rate (F), and valve opening (OU). There are several reasons why the model may show an abnormal residual value or range, for example, it can be due to a change in fluid density, a blockage in the pipe or valve, loss and/or a fault of any instrument.

All these faults that explain the causes why a model fails its normal correlation, are stored. In the presence of an anomaly in the model, the assumption of the occurrence of one of these anomalous situations is generated.

Model Unit Using PCA

With the measured variables of the equations, a Principal Component Analysis (PCA) model is being built using historical data from the process. Given the model i with N variables and its normalized historical data $H_i$, its correlation matrix $\Gamma_i$ is calculated. PCA is performed through said matrix, obtaining its n eigenvectors ($\Lambda_1, \ldots, \Lambda_N$) and its associated eigenvalues ($\alpha_1, \ldots, \alpha_N$, positive and sorted from highest to lowest)

The relative weight ($\Psi_n$) of eigenvalues $\alpha$ is calculated:

$$\Psi_n = \frac{\alpha_n}{\sum_{k=1}^{N} \alpha_k} \quad \forall n = 1aN \tag{3}$$

where n is the number of the variable. Then, the accumulated weight is calculated as:

$$P\exp_n = \sum_{k=1}^{n} \Psi_k \tag{4}$$

The model to be followed must explain at least a certain percentage of the existing correlation, which is defined as MinExp. The first N−(l−1) eigenvectors are taken as "loadings" P of the model, being:

$$l = \text{Number of elements of } P\exp > \text{MinExp} \tag{5}$$

being the remaining l−1 eigenvalues as residual loadings Pe of the model $$P = \Lambda_1, \ldots, \Lambda_{N-(l-1)} \tag{6}$$

$$Pe = \Lambda_{N-l+2}, \ldots \Lambda_N \tag{7}$$

MinExp can be in the range of 0 to 1 and it is fixed in 0.85 for N=2, 0.93 for N=3 and in 0.95 for N>3.

Calculation Module

Figure 3:
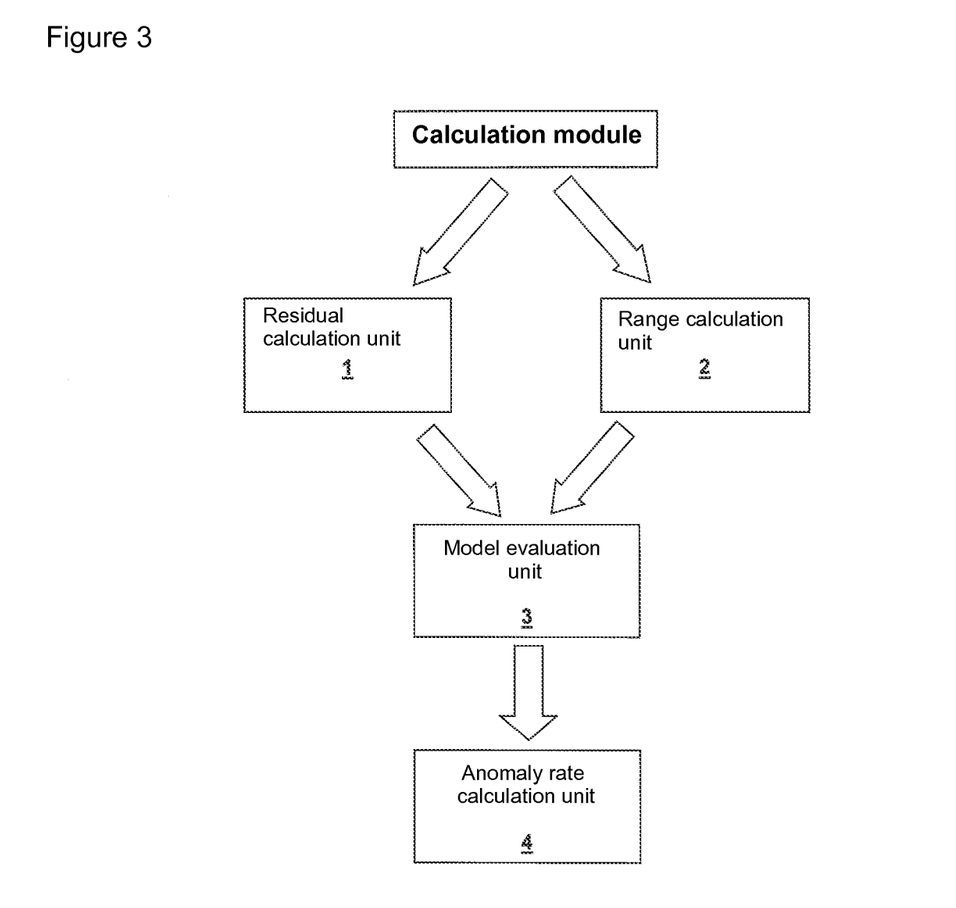
FIG. 3 shows a more detailed scheme of the calculation module (4) corresponding to FIG. 1 of the present invention. The same is an example and is comprised of four units.

Referring now to FIG. 3, as exemplary embodiment of the present invention, it shows a detailed scheme of the calculation module (4) shown in FIG. 2.

Residual Calculation Unit

For each equation with its set of variables the principal eigenvectors P are taken as PCA model, leaving the last eigenvectors Pe as residue. Therefore, each measured point "H" can be represented as the sum of a term corresponding to the model and one corresponding to the error.

$$H = H_{Model} + E \tag{8}$$

$H_{model}$ is calculated from H using the first n−l+1 principal components grouped in the matrix P:

$$H_{Model} = TP^T = \sum_{k=1}^{N-l+1} t_k p_k^T \tag{9}$$

where T is the score of PCA model and is calculated as the product of H*P.

In the case of residual calculation, the last l−1 principal components $P_e$ are used.

$$E = T_e P_e^T = \sum_{k=1}^{l-1} te_k pe_k^T \tag{10}$$

where $T_e$ is the product of $H*P_e$.

The residual to be calculated is the difference between the value of H estimated by the PCA model and the measured value. To determine whether the model represents the current operating condition of the process, the sum of squared error of the model, that is the square of the distance between the measured point and the model hyperplane, is calculated.

$$E = H - H_{Model} \tag{11}$$

$$SumSPE = \sum_{n=1}^{N} E_n^2 \tag{12}$$

Range Calculation Unit

In addition to the distance of the data to the model provided by the SumSPE, the distance of the data projected in the model to the center thereof, is calculated.

This distance is calculated using $T^2$ Hotelling statistical analysis as:

$$T^2 = TS^{-1}T^T \tag{13}$$

where S is a matrix with the covariance of scores T of PCA model of X, which is reduced to a diagonal matrix formed by the N−l+1 principal eigenvalues ($\alpha_1, \ldots, \alpha_{N-l+1}$):

$$S_{uv} = \begin{cases} \alpha_u & \text{if } u = v \\ 0 & \text{if } u \neq v \end{cases} \tag{14}$$

Equation Evaluation Unit

The sum of SPE (SumSPE, Eq. 12) of equation i is compared to a confidence limit calculated from the historical data using a percentile or a probability distribution with a confidence interval, which can vary between 0% and 100%. Preferably it is used the technique described in "A User's Guide to Principal Components" J. Edward Jackson (2003) Wiley-IEEE Mathematics ISBN 0471471348. The results of these evaluations are stored in a vector SF of I (number of models) elements, which can be defined, inter alia, by one of the following manners:

1. Applying classical logic:
    For instance, for binary logic:
    $SF_i = 1$ if the residual of PCA model of equation i is greater than the confidence limit or threshold and
    $SF_i = 0$ if the residual of PCA model of equation i is less than the confidence limit or threshold.
2. Applying fuzzy logic:
    $SF_i$ is a continuous function between 0 (indicating a small value in the residual) and 1 (indicating a large value in the residual).

In particular, $SF_i$ was defined as follows:

$$SF_i = \frac{SumSPE_i^q}{SumSPE_i^q + Lspe_i^q} \quad (15)$$

where $Lspe_i$ is the confidence limit of the model of equation i and $SumSPE_i$ is the sum of SPE calculated from Eq. 12 for equation i. q is a parameter with value greater than one that regulates function smoothness.

In this case $SF_i$ indicates the likelihood of anomaly in the residual of equation i.

An adequate value for q is q=3.

$T^2$ from Hotelling statistical analysis is also compared to a calculated limit for some confidence interval, which can vary from 0% to 100%, using a percentile of historical data or some probability distribution. Preferably, it is used the technique described in "A User's Guide to Principal Components" J. Edward Jackson (2003) Wiley-IEEE Mathematics ISBN 0471471348. The results of these evaluations are stored in a vector TF of I elements, which is defined by one of the following manners:
1. Applying classic logic:
   For instance, for binary logic:
   $TF_i=1$ if T2 from PCA model of equation i is greater than the confidence limit or threshold and
   $TF_i=0$ if T2 from PCA model of equation i is less than the confidence limit or threshold.
2. Applying fuzzy logic:
   $TF_i$ is a continuous function between 0 (indicating a small value in the residual) and 1 (indicating a large value in the residual)
In particular, $TF_i$ was defined as follows:

$$TF_i = \frac{(T_i^2)^q}{(T_i^2)^q + Lt_i^q} \quad (16)$$

where $Lt_i$ is the confidence limit of the model of equation i and $T^2_i$ is Hotelling statistic calculated from Eq. 13 for equation i. q is a parameter with value greater than one that regulates the function smoothness.

In this case, $TF_i$ indicates the anomaly probability in the range of equation i.

An adequate value for q is q=3.

Parameter and Fault Definitions

As mentioned, each equation i has associated measured variables, with which the PCA model is built and abnormal situations that explain the possible causes of failure of the equation. These can be instruments, out-of-range variables and other more complex faults that are manifested in the violation of SumSPE and/or $T^2$ maximum of the equation.

These possible anomalous situations of equation i can be associated with a violation of SumSPE, a violation of the $T^2$ statistic or a violation of any of the two. That is, anomalous situations will be identified for each equation as being associated to SumSPE, to $T^2$ or to both of them. This is a $Midpar_z$ matrix of I rows and 3 columns for each parameter z:

$$Midpar_{z_i} = \begin{cases} [1\ 0\ 0] & \text{if parameter } z \in \text{to } SumSPE \text{ in equation } i \\ [0\ 1\ 0] & \text{if parameter } z \in \text{to } T^2 \text{ in equation } i \\ [0\ 0\ 1] & \text{if parameter } z \in \text{to both of them in equation } i \\ [0\ 0\ 0] & \text{if parameter } z \notin \text{to equation } i \end{cases} \quad (17)$$

where z indicates a unique identification number of the anomalous situation and i is the number of the equation.

The decision of the limit to which is associated an anomalous situation in a given equation can be anyone, using the following general criteria:
If the anomalous situation corresponds to an instrument it is associated to SumSPE and to $T^2$.
If the anomalous situation corresponds to a range of a variable it is classified as follows:
The vector APi is defined as the quadratic contribution of variables of equation i to the PCA model residue:

$$AP_{ij} = \sum_{k=1}^{i-1} (Pe_{jk})^2 \ \forall\ j = 1aN \quad (18)$$

where N is the number of variables in equation i and j is the variable number inside this equation. This variable will have an anomalous situation z associated with it, corresponding to an anomaly in the range of said variable and another number z associated with an anomaly in instrument of said variable.

$$\begin{cases} \text{If } AP_{ij} \geq \frac{(1-1)}{a \cdot n} \Rightarrow \text{The anomalous situation of range} \in \text{to } T^2 \\ \text{Ifi } AP_{ij} < \frac{(1-1)}{a \cdot n} \Rightarrow \begin{array}{l} \text{The anomalous situation of range} \\ \in \text{to } SumSPE \text{ and to } T^2 \end{array} \end{cases} \quad (19)$$

Having 'a' any value. An appropriate value is a=2.
Other parameters are only associated to a violation of SumSPE.

Calculation Unit for Fault Rate of Anomalous Situations

From the evaluation of equations and taking into account the limit to which abnormal situations are associated in the respective equations a failure rate of all possible anomalous situations is obtained, which rate ranges between 0 (normal) and 1 (anomalous).

To calculate this rate the UF matrix of I rows and 3 columns is formed, which is defined as $$UF_i = [SF_i, TF_i, \max(SF_i, TF_i)] \quad (20)$$

The fault rate is calculated as:

$$F_z = \frac{\sum_{i=1}^{I} UF_i \cdot Midpar_{z_i}^T}{\sum_{k=1}^{3} \sum_{i=1}^{I} Midpar_{z_{ik}}} \quad (21)$$

where z is the anomalous situation for which you want to calculate the failure rate and I is the total number of equations.

Particularly, when the anomalous situation z is a range, it is recommended to calculate $F_z$ as:

$$F_z = \frac{\left(\sum_{i=1}^{I} UF_i \cdot Midpar_{z_i}^T\right) \cdot (1 - \text{Weight}) + \text{Weight} \cdot FT11_z}{\sum_{k=1}^{3} \sum_{i=1}^{I} UF_{ik}} \quad (22)$$

where:

-continued $$FT11_z = \frac{(T11_z)^q}{(T11_z)^q + (T11\ lim_z)^q} \quad (23)$$

and T11 is Student's statistic of the measured variable linked to z. T11lim is calculated using a percentile or a probability distribution with a confidence interval that can vary between 0% and 100%. Preferably it is used the technique disclosed in "A User's Guide to Principal Components" J. Edward Jackson (2003) Wiley-IEEE Mathematics ISBN 0471471348.

q was taken as q=3 and Weight=0.5. The latter indicates the proportion of $FT11_z$ in the calculation of $F_z$.

If the anomalous situation z corresponds to an instrument it is recommended to calculate Fz as described in patent AR 063876 B1, "Dispositivo y procedimiento para detección y/o diagnostico de fallas en sensores".

Analysis and Diagnosis Module.

Because normally faults propagate or, in some rare cases, several faults occur simultaneously, it is rare to find a situation of a single fault in a real case. In general there are several fault rates of anomalous situations greater than zero.

In these cases there may be various combinations of anomalous situations explaining the presence of found anomalous equations. To deal with this situation it is necessary to calculate a rate of feasibility for each of the possible sets of detected anomalous situations.

The diagnosis is made by evaluating a feasibility rate of the various possible events considering cause-consequence relationships between anomalous situations. That is, the feasibility of the various anomalous situation paths is evaluated, regardless of the existence of a cause-consequence relationship among them, being the feasibility of the path greater when such a relationship exists.

Given a path r of anomalous situations, it is defined as:

$$Rec_{rz} = \begin{cases} 1 & \text{If } thh \text{ parameter } z \in \text{ to path } r \\ 0 & \text{Otherwise} \end{cases} \quad (24)$$

where Rec is a matrix of R (total number of paths) rows by Z (total number of anomalous situations) columns.

To perform the diagnosis it is necessary to define the list of causes-consequences of faults, i.e. to indicate for an anomalous situation $z_{(s)}$, what other anomalous situations $z_{(t)}$ can fail as a result of $z_{(s)}$.

These relationships can be indicated in a list mode, in a matrix, or in any other way. In this case, the matrix Ady of Z rows by Z columns is used to define it:

$$Ady_{st} = \begin{cases} 1 & \text{If the anomalous situation } z_{(s)} \text{ causes} \\ & \text{the fault of anomalous situation } z_{(t)} \\ 0 & \text{Otherwise} \end{cases} \quad (25)$$

Optionally, matrix Ady can also be defined considering an index or weight in the cause-consequence relationship as follows:

$$Ady_{st} = \begin{cases} IP_{st} & \text{If the anomalous situation } z_{(s)} \\ & \text{causes the fault of the anomalous situation } z_{(t)} \\ 0 & \text{If the anomalous situation } z_{(s)} \text{ dose not} \\ & \text{cause the fault of the anomalous situation } z_{(t)} \end{cases} \quad (26)$$

where $IP_{ST}$ is an index that indicates the weight of an anomalous situation $z_{(s)}$ in causing a fault in the anomalous situation $z_{(t)}$.

The probability of occurring two independent events that, in our case, is about those having no causal relationship is simply the product of the probability of each event. Therefore, when having a series of independent events, it is easy to calculate the feasibility of occurrence as the product of their feasibilities.

In cases where there is a causal relationship relating two anomalous situations, the feasibility of the group of anomalous situations will be greater than the product of the failure rates, since this would be the feasibility when there is no causal relationship between them. Furthermore, the feasibility of occurrence of both faults will be less than the fault rate of the less likely anomalous situation. The latter responds to maintaining a conditional probability at a value less than one.

Considering these upper and lower limits it was decided to use the average of these, i.e. h=2. While h can be any number greater than 0, preferably greater than 1. Eq. 27 shows an example for three anomalous situations with or without cause-consequence relationship:

$$Pcond = \quad (27)$$

$$\begin{cases} F_1 \cdot F_2 \cdot F_3 + \dfrac{\min(F_1, F_2, F_3) - F_1 \cdot F_2 \cdot F_3}{h} & \text{if } \exists \text{ cause-consequence relationship} \\ F_1 \cdot F_2 \cdot F_3 & \text{if there is no cause-consequence relationship} \\ & (Ady_{st} = 0 \forall s, t = 1 \text{ to } 3) \end{cases}$$

The paths may be anomalous situations, as mentioned heretofore, totally independent or totally related, i.e. all parameters are connected (connected paths). There are other cases where there may be not connected paths. In these, feasibility is given by the product of the feasibility of both paths.

A correction factor for independent events was taken as equal to a constant b arbitrarily chosen between 0 and 1 raised to the number of independent initial causes:

$$Fcorrec_r = (b)^{v-1} \quad (28)$$

being v the minimum and required amount of root nodes of that path. Fcorrec is a vector of R elements, each of them being the correction factor for each path This correction is necessary because of the occurrence of anomalous situations with an Fz rate equal to one does not affect the feasibility of paths with several root causes (multiply by 1), and this is undesirable. A factor b=0.5 was used, but its value can vary between 0 and 1.

A connected path, but having more of one starting node will also be applied the factor of Eq. 28.

A final type of correction is related to the number of equations used by the anomalous situations of the path r under study. For calculating Fz failure rates of anomalous situations, fault likelihoods of the equations to which they are associated are used. This is the reason why the higher the likelihood of fault in each of the equations to which a fault is associated, the higher the failure rate of this anomalous situation.

Until now, when a series or path of anomalous situations that does not include a given equation is selected, there is no penalty. This would be a mistake because the most likely diagnosis should explain all the found evidence. Thus, it is used a correction factor that is the product of the likelihood that each of the not used equations has not failed. Not used equations should be identified in the $Rec_r$ path:

$$ActSPE_{ri} = \begin{cases} 1 & \text{if } \exists Rec_{rz} = \dfrac{1}{\text{the parameter } z \in \text{ to the}} \\ & \text{equation } i \wedge (Midpar_{z_{t1}} = 1 \vee Midpar_{z_{t3}} = 1) \\ 1 - SF_i & \text{if } Rec_{rz} = 0 \vee \text{parameter } z \in \text{ to the} \\ & \text{equation } i \text{ complying with} \\ & (Midpar_{z_{t1}} = 1 \vee Midpar_{z_{t3}} = 1) \end{cases} \quad (29)$$

where ActSPE is a matrix of R rows and I columns, and an element $ActSPEr_i$ indicates with a 1 if a path r contains an anomalous situation associated to the residue or SPE of equation i and with a value of $1-SF_i$ which corresponds to the probability of such equation not being anomalous, in the opposite case.

$$ActT_{ri}^2 = \begin{cases} 1 & \text{if } \exists Rec_{rz} = \dfrac{1}{\text{the parameter } z \in \text{ to the}} \\ & \text{equation } i \wedge (Midpar_{z_{t2}} = 1 \vee Midpar_{z_{t3}} = 1) \\ 1 - TF_i & \text{if } Rec_{rz} = 0 \vee \text{parameter } z \in \text{ to the} \\ & \text{equation } i \text{ complying with} \\ & (Midpar_{z_{t2}} = 1 \vee Midpar_{z_{t3}} = 1) \end{cases} \quad (30)$$

Where $ActT^2$ is a matrix of R rows and I columns, and an element $ActT^2_{ri}$ indicates with a 1 if a path r contains an anomalous situation associated to the range of equation i and with a value of $1-TF_i$ which corresponds to the probability of such equation not being anomalous, in the opposite case.

By means of matrixes ActSPE and $ActT^2$ defined in Eqs. 28 and the penalty for each path r is calculated, forming a vector Ppenal pf R elements.

$$Ppenal_r = \prod_{i=1}^{I} ActSPE_{ri} \cdot \prod_{i=1}^{I} ActT_{ri}^2 \quad (31)$$

Once the penalty vectors are defined: Ppenal for not using the alarmed equations, Fcorrec and F one proceeds to calculate the feasibility $Pp_r$ or each path $Rec_r$, which can be summarized as follows:

$$Pp_r = \left( \prod_{q=1}^{Q} \left( \prod_{s=1}^{S_q} F_s^q + \dfrac{\min(F^q) - \prod_{s=1}^{S_q} F_s^q}{h} \right) \right) \cdot (Fcorrec_r) \cdot Ppenal_r \; \forall \, r = \quad (32)$$

$$1 \text{ to } R$$

being Q the number of not related paths of path $Rec_r$, $S_q$ the number of parameters of related path q and $F^q$ a vector of length $S_q$ with the fault rates F of the parameters of path q.

r is the number of path, being R the total number thereof.

Finally, h is greater than 1, to maintain the conditional probability to a value less than 1 and, as mentioned heretofore, the used value for h is h=2.

Due to the large number of parameters, the combinations to be evaluated can be very large and those parameters z the $F_z$ of which is less than a given value may not be considered, namely:

$$\text{If } F_z < Flim \Rightarrow F_z = 0 \forall z \quad (33)$$

where Flim can have a value between 0 and 1. Flim=0.3 is an adequate value.

The most feasible paths will be the most likely causes of having caused the anomalous situation in the process.

To sort the paths according to their feasibility only the most feasible path for each set of root causes is taken.

Thus, the initial causes of the anomaly in the process are obtained, indicating the consequences caused that manifested in the process due to the initial fault.

The analysis results are then reported to the user via the communication module (6)

The invention claimed is:

1. A device for detecting and/or diagnosing faults, including multiple faults, in processes, equipment and sensors used to measure and control variables of a process, based on the calculation of residuals between measured values and values calculated by a plurality of models, the device comprising:
   data storage means for storing data, comprising a magnetic storage device or other kind of memory;
   pre-processing means for filtering data, of a running median filter type or a temporal average filter type or other filter type;
   modeling means for generating and storing multiple models of process behavior under normal conditions, built up from heat, mass and motion balances, stoichiometric and quality relationships and other kind of relationships, and existing correlations between variables measured by process sensors;
   residual calculating means for calculating the difference between measured values and predicted values for variables;
   calculating means for calculating a fault set, that may include causal relations between the faults, by computing the probability of anomalies in parameters or faults and most feasible fault sets that will be the most likely causes of having caused an anomaly in the process, wherein the fault sets are sorted according to their feasibility by taking only the most feasible path for each set of root causes, thus obtaining the initial cause of the anomaly in the process and indicating the consequences caused that manifested in the process due to the initial anomaly;
   analysis means for determining the need to report an anomalous situation in a given process, equipment or sensor, capable to deliver results ranging from a mere detection of a problem to a diagnosis of the problem beyond the variables involved; and
   communication means to present a status report of the process.

2. The device of claim 1, wherein the modeling means generates all linear models that correlate groups of two or more variables from measured and normalized historical data.

3. The device of claim 1, wherein the calculating means generates a residual for each of the models.

4. The device of claim 1, further comprising means of analysis that compare each residual with its threshold value and calculate a fault feasibility rate for each variable.

5. The device of claim 1, wherein the communication means can send the obtained results via an interface, a screen, an e-mail, or other communication devices, either wired or wireless.

6. A method for the detection and/or diagnosis of faults, including multiple faults in sensors, used to measure and control variables of the process, whereby the means of claim 1 and on the basis of the residual calculation between the measured values and the calculated values by the plurality of models, built up from the existing correlations between the variables measured by the process sensors, the status report of the process is presented by through the corresponding communication means, thus obtaining a sensor status, detecting if their operation is normal or with faults, and even diagnosing if a fault is likely to happen, after the performed detection.

* * * * *